ically heating the various sections or by electrical resistance heating the various sections.

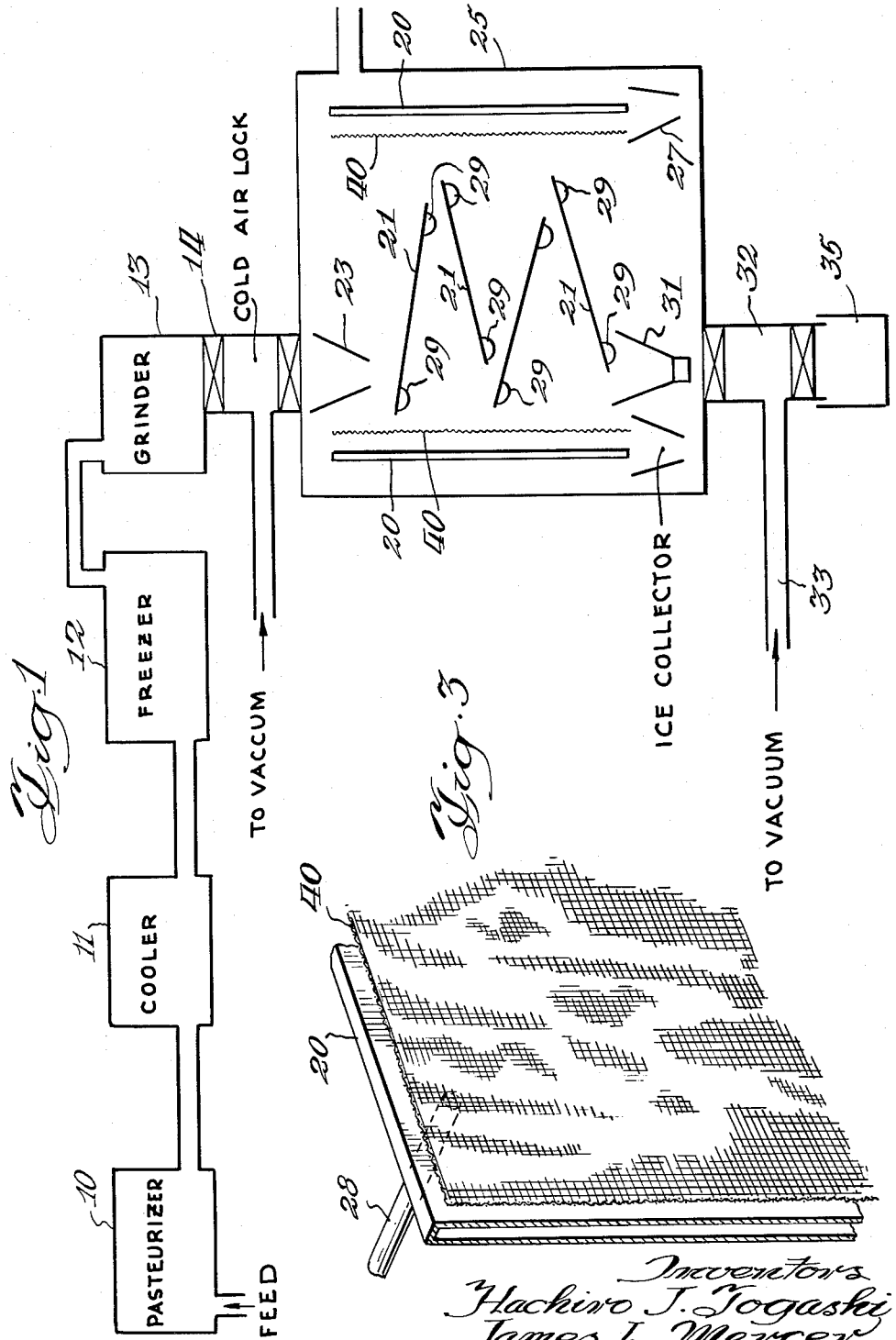

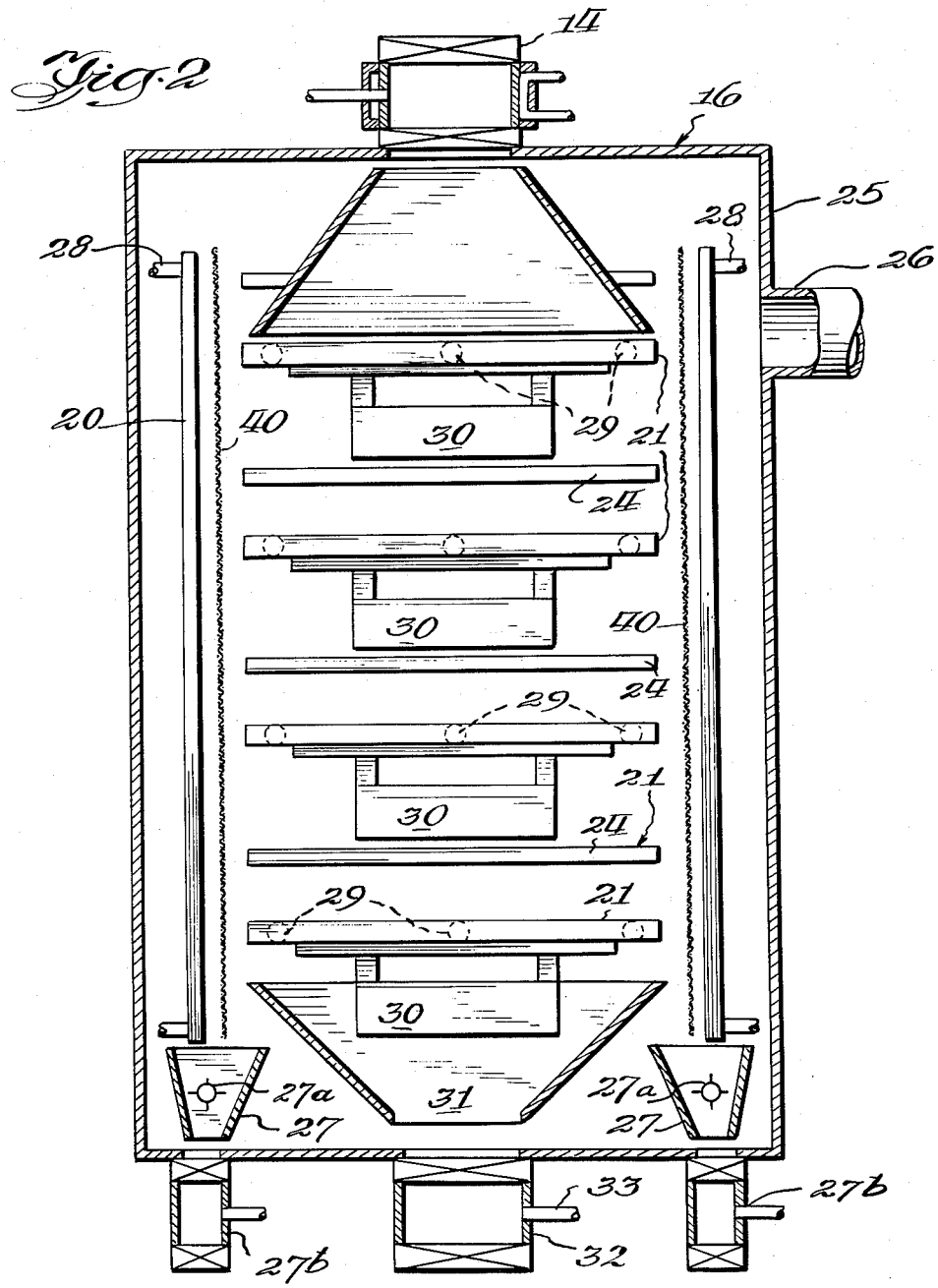

United States Patent Office 3,247,600
Patented Apr. 26, 1966

3,247,600
DE-ICING METHOD AND APPARATUS
Hachiro Togashi, Chicago, and James L. Mercer, Arlington Heights, Ill., assignors to Cryo-Maid, Inc., West Palatine, Ill., a corporation of Delaware
Filed Feb. 25, 1964, Ser. No. 347,156
6 Claims. (Cl. 34—5)

This invention relates generally to the process and apparatus for removing ice formed on cold surfaces and more specifically concerns itself with the instantaneous removal of ice from a condenser section in a vacuum environment.

Our pending application, Serial No. 263,284 and now abandoned, filed on March 6, 1963, pertains to a method for drying frozen particles. It was therein disclosed that the rapid and economical drying of products containing a large percentage of water could be accomplished by first quickly freezing the product to be dried and, after shredding or grinding the frozen product into small particles, if necessary, introducing it to a dehydrating zone wherein the water in each of the particles is caused to be sublimed at a low temperature and pressure. In the dehydrating zone, the particles are moved along a pathway while being agitated, as by a series of vibrating trays, while being supplied with radiant energy to furnish the heat of sublimation necessary for drying.

Once in the dehydrating zone, the product particles are dried, with the frozen water subliming so that no thawing occurs, the thawing being prevented by maintaining the pressure and temperature in the dehydrating zone sufficiently low so that the refrigerating effect caused by the sublimation of the ice crystals in the particles serves to keep them solidly frozen. It has been found for our purposes that maintaining the pressure in the dehydrating zone below about 500 microns Hg is satisfactory although it is appreciated this pressure value could be varied, if desired.

As disclosed in our referenced application, following sublimation of the ice crystals, the water vapor, because of the conductance afforded by our system, travels at a high velocity to the condenser or cryoplate sections which are incorporated in our drying system for maintaining a low pressure in the overall drying process. The water vapor, upon contact with the cryoplate section surfaces, condenses in the form of ice.

When using the cryoplate sections or internal condensers disclosed in our pending application, it is necessary that means be provided to remove the collected ice from the condenser or cryoplate sections and thereafter remove it from the vacuum system in order to permit substantially continuous steady state operation of the drying process. Various methods can be employed for such ice removal as, for example, flexing the cryoplate section to loosen the ice, heating the ice directly to melt it and scraping the ice with a mechanical device. These methods, however, have proved unsatisfactory for a number of reasons. The cost of scraping equipment, the difficulty in operating mechanical equipment under vacuum conditions, and the time required for scraping are undesirable features inherent in mechanical scraping. In the case of flexing there are increased stresses and strains imposed upon the condenser or cryoplate sections which cause a reduction in their wear life. Direct heating, on the other hand, requires a shut-down in operation of the process or use of external condensers which are quite undesirable in our drying system.

In accordance with the invention, ice is removed rapidly, efficiently, and economically from a condenser or cryoplate section surface in a vacuum environment by rapidly applying heat to the section itself. This can be accomplished either by passing a heated fluid, e.g., trichloroethylene, through the condenser or cryoplate section, or by electrically heating the various sections. It has been found when a sufficient layer of ice has been accumulated, usually about ½ to ¾ inch thick, and heat is rapidly applied to a cryoplate section, the ice will literally explode away from the surface of the cryoplate section.

The effect of such a reaction in the vacuum environment is quite advantageous to applicants' drying process, since no melting of the ice occurs. Further, only a slight temperature increase of a few degrees is required to cause the entire ice coating to explode from a condenser section, as opposed to heating the surface to the melting point of ice in order to remove the ice. Moreover, the heat energy necessary for removing the ice from the surface of the condenser is kept to a minimum since only the ice surface adjacent the condenser need be heated before the entire ice coating explodes away from a condenser section. Finally, after only an extremely short heating period, the ice explodes instantaneously away from the condenser surface whereas the de-icing methods outlined above require a much longer time heating period for ice removal.

The invention will be better understood from the following detailed description thereof, taken in conjunction with the accompanying drawings, wherein:

FIGURE 1 is a diagrammatic flow sheet of the process;

FIGURE 1 is a front view of the dehydrating chamber in partial section to show the interior thereof; and FIGURE 3 is a fragmentary view of a section of the meshed ice shield disposed between the condenser sections and dehydrating zone.

Referring generally to FIGURE 1, the product, e.g., a liquid such as an aqueous coffee extract, may be introduced, if necessary, to pasteurizer 10 and then passed to pre-cooler 11 where it is cooled to almost the freezing point. Following, the product passes to freezer 12 where it is quickly frozen to a temperature on the order of —10° C. to —25° C. or lower, if desired.

If required, the product is shredded or ground to the desired particle size in grinder 13, after which the frozen particles are passed to air lock 14, wherein all air is removed and the particles are held in a vacuum of about 400 to 800 microns subject to their introduction to drying chamber 25. A vacuum pump (not shown), preferably involving a cryoplate condenser, communicates with air lock 14 through conduit 15. The frozen particles are fed at desired intervals from air lock 14 into hopper 23 and from the hopper to tray 21, situated below hopper 23. Hopper 23 and air lock 14, if desired, may be refrigerated.

Drying chamber 25 contains one or more stacks of trays 21 bounded on each side by many individual internal condenser sections 20. The sections are maintained at a suitably low temperature, usually about —30° F. and preferably below —50° F., by any suitable means, e.g., dry ice, mechanical refrigeration, or liquid cryogens. It is to be appreciated that the temperature range recited here is for purposes of illustration only and is not to be construed as a limiting feature of our invention. Condenser sections 20 function as high-speed pumps, maintaining a low pressure by causing water vapor and other condensable gases to freeze on the surfaces of the respective sections.

Trays 21 are agitated by vibrators 30 in order to impart a dancing or multidirectional motion to the frozen particles. As the particles move along on vibrators 30, they pass under a source of radiant energy which may comprise heated plates 24 which are heated electrically or by any other suitable means. Upon heating, sublimation occurs and the frozen water contained in the particles to be dried turns to vapor which rapidly travels to the surfaces of condenser sections 20 where it accumulates on the surfaces in the form of ice.

Upon completion of the drying operation, the dried particles are collected in hopper 31, from where they pass through air lock 32, which may be refrigerated, if desired, and then to receiver 35. Vacuum connection 33 is provided for evacuating air lock 32.

As mentioned heretofore, the moisture in the particles sublimes and the vapor forms as an accumulation of ice on sections 20. In order to remove the collected ice from the condenser sections and vacuumized chamber 25, we have ascertained that when a heated brine or other solution is passed through a section 20, or a condenser section is heated electrically, the ice explodes instantaneously away from the surface of the condenser section being de-iced. In order to prevent the exploding ice from finding its way into the product stream, we have positioned screen 40 between condenser sections 20 and the product, the screen being of sufficient mesh size to effectively hold back the exploding ice, although it does not impede the conductance of the water vapor to the condenser section surfaces.

The ice, following its explosion from the surfaces of condenser sections 20 and impact on screen 40, falls by gravity to the bottom of chamber 27 where it is broken or granulated, e.g., by breaker 27a, and removed by a conveyor or other suitable means (not shown) through air locks 27b.

In order to have our drying process remain in continuous operation and to maintain it in steady state condition, only a few of the sections are de-iced at any one time. In this manner, the low pressure condition required in chamber 25 is maintained.

We do not definitely know the reasons for the explosive effect produced in the invention. We can hypothesize, however, that a slight rapid increase in temperature of a condenser section causes the ice in contact with the surface of the section to sublimate and create a pressure build-up at that location of such magnitude that the ice explodes instantaneously away from the condenser surface.

Although the particular valving has not been shown which permits the entry of a hot fluid such as brine or some other solution into the condenser sections, it is appreciated that a number of different valve arrangements could readily be devised by an artisan skilled in the art to provide for the flow of the fluid and cryogen in the condenser sections. Moreover, no electrical connections have been illustrated depicting the electrical heating of a condenser section, but again the providing of such connections would be readily apparent to one skilled in the art.

This particular application has disclosed the de-icing processing at low temperature and pressure in a system for drying frozen product particles. It is to be appreciated, however, that this low pressure and temperature de-icing is not to be limited to this particular application but that it could be employed in other environments.

The foregoing detailed description has been given for clearness of understanding only, and no unnecessary limitations should be understood therefrom, as modifications will be obvious to those skilled in the art.

What is claimed is:

1. In an apparatus for drying a quick frozen, moisture laden product comprising a chamber which is vacuumized, means for removing noncondensable gases from the chamber, a pathway for said product within the chamber, means for moving said product along the pathway, at least one condenser section disposed within said chamber and adjacent an edge of the pathway, means for supplying a refrigeration medium to the condenser section, means for supplying radiant energy to said product in the pathway, means for rapidly heating at least one condenser section whereby ice accumulated on the surface of said condenser section is substantially instantaneously removed without substantial melting, and obstruction means disposed between said section and said pathway for precluding the introduction of said ice into said pathway.

2. An improvement in accordance with claim 1 wherein said obstruction means comprises a mesh shield, the openings of said mesh shield being sufficient to prevent said ice from contacting the product to be dried while at the same time allowing maximum conductance of water vapor to said condenser sections.

3. A method of drying a water-laden, heat-sensitive material which comprises quick freezing the moist material to a temperature below that at which thawing occurs in any part thereof, maintaining the frozen material in an evacuated gas-free system, in proximity to and in unrestricted relationship to at least one condenser section while supplying energy to said material to cause sublimation of the ice crystals contained in said frozen material to water vapor, while maintaining the pressure sufficiently low to prevent thawing in any part of the frozen material, freezing said water vapor on said condenser section, the conductance of the system being greater than the rate at which water vapor is formed by the sublimation of said ice crystals, and de-icing said condensed section by rapidly heating the surface of said section to increase its temperature whereby said ice is instantaneously removed from said section without substantial melting.

4. The method in accordance with claim 3 employing a plurality of condenser sections wherein at least one of the condenser sections is de-iced while at least another of the condenser sections is condensing vapor thereon.

5. The method in accordance with claim 3 wherein the pressure of said gas-free system is maintained below about 500 microns Hg.

6. The method in accordance with claim 3 wherein the surface temperature of said condenser section is maintained below about −30° F.

References Cited by the Examiner

UNITED STATES PATENTS

| 2,533,125 | 12/1950 | Levinson | 34—5 X |
| 2,853,796 | 9/1958 | Sanders | 34—5 X |
| 3,132,930 | 5/1964 | Abbott et al. | 34—5 X |

OTHER REFERENCES

| 555,000 | 3/1958 | Canada. |
| 948,517 | 2/1964 | Great Britain. |

WILLIAM F. O'DEA, *Primary Examiner.*

ROBERT A. O'LEARY, *Examiner.*